3,533,875
Patented Oct. 13, 1970

3,533,875
METHOD OF FORMING DELUSTERED FINISHES ON THERMOSETTING RESINS
Frank E. Carevic and Joseph L. Sannella, West Chester, Pa., assignors to FMC Corporation, Philadelphia, Pa., a corporation of Delaware
No Drawing. Filed Dec. 2, 1966, Ser. No. 598,622
Int. Cl. B32b 31/00
U.S. Cl. 156—289                                    4 Claims

ABSTRACT OF THE DISCLOSURE

Method of molding and setting synthetic resins in contact with a non-fibrous cellulosic sheet having a surface coating of an aluminum or chromium complex compound of the Werner type to prevent bonding of these sheet to the resin. The degree of gloss of the set resin may be varied by including in the cellulosic sheet finely-divided cellulosic particles of a specific type.

---

This invention relates to a method of forming synthetic resin coatings and molded shapes by the use of a releasable non-fibrous cellulose sheet or film.

In the forming of a wide variety of articles, synthetic resins are used as coatings or laminated structures are formed by impregnating sheet materials with synthetic resins and molding the article to shape. Common articles of this type are countertops, tabletops and molded radio and television cabinets. For many applications, particularly furniture items, the high gloss obtained from highly polished mold surfaces was objectionable. Press or caul plates have been used having various surface finishes. However, for different degrees of gloss finish or luster, separate plates are required each having a specific surface finish and replacement of the plates from time to time is necessary due to the normal wear of the surface. Alternatively, it was necessary to incorporate in the resin a delustering agent or to form the surfaces with a mirror or high gloss finish and subject the surfaces to an abrading action to provide the desired luster.

In copending application Ser. No. 543,067, filed Apr. 18, 1966, now abandoned, there is disclosed a method of molding or casting of synthetic resins in contact with a non-fibrous cellulosic film or sheet containing a specific form of finely divided β-1,4 glucan-containing material. This method is particularly adapted for use in procedures commonly known as contact pressure and low pressure molding methods where the pressures will not exceed about 500 p.s.i. and the molding and curing of the resins involve relatively low temperatures. The application also discloses the incorporation in the film of a small proportion of a conventional anchoring agent commonly used in preparing coated cellulosic films such as moistureproof cellophane.

In molding methods, commonly termed high pressure methods involving the use of pressures above 500 p.s.i. and involving higher temperatures required for curing various thermosetting resins, these cellulosic films adhere to the molded surface tenaciously and, in some instances, cannot be stripped from the molded surface without destroying the surface uniformity.

One of the purposes of the present invention is to provide a simple method of forming synthetic resin surfaces having any desired surface finished.

Another purpose of the invention is to provide a method of molding or casting synthetic resins in contact with a cellulosic film so as to provide any desired finish to the molded surface and permit the ready stripping of the film from the molded surface.

Other objects and advantages of the invention will become apparent from the following description and claims.

The present invention contemplates a procedure wherein the synthetic resin is molded or cast and cured in contact with a cellulosic film containing a specific form of finely divided β-1,4 glucan-containing material and having a surface coating of a complex compound of the Werner type in which a trivalent nuclear chromium or aluminum atom is coordinated with an acyclic carboxylic acido group having at least 10 carbon atoms.

The β-1,4 glucan-containing material is a water-insoluble, organic material of which a major proportion is β-1,4 glucan and is originally derived from cellulose-containing plant life, in most instances, wood, cotton, and bast or leaf fibers. In general, materials obtained from a holo-cellulose source are most useful, for example, ramie, flax hemp, cotton, processed cellulose-containing material, for example, cotton linters, purified cotton, wood pulp such as bleached sulfite and sulfate pulps, regenerated forms of cellulose including rayon and cellophane, and the like. If the source material is too low in β-1,4 glucan content, it is purified to remove nonessential or undesirable components such as pentosans, galactomannans, glucomannans, and the like, to provide a product containing at least a major proportion and preferably from 90 to about 99% of β-1,4 glucan.

Hereinafter, the term "cellulose" will be used to represent β-1,4 glucan-containing materials for ease of explanation and illustration.

The production of the finely-divided material may be facilitated by first subjecting the cellulose material to chemical degradation in a known manner, for example, the material may be subjected to acid or alkali hydrolysis, or enzymatic treatment. One specific method of obtaining the desired result is reported in U.S. Pat. No. 2,978,446, issued Apr. 4, 1961, to O. A. Battista et al., wherein cellulose is subjected to a 2.5 normal aqueous solution of hydrochloric acid at boiling (about 105° C.) for 15 minutes. This more drastic hydrolysis treatment provides a material which may be readily mechanically attrited in an aqueous medium with a nominal amount of energy. Similar treatments with mineral acids or alkali under more or less drastic conditions will produce attritable degraded cellulose using nominal or increased energy for disintegration of the material to the proper particle size.

Mechanical attrition may be carried out by known techniques using, for example, kitchen type mixers, blenders, planetary mixers, ball mills, attrition mills, sonic mixers, high speed shearing devices and the like. In addition, the material may be forced through a multiplicity of fine holes whereby it is subjected to a shearing action first by passage through said holes and thereafter by rubbing together of the various particles under the influence of applied force. The disintegration is preferably carried out in the presence of an aqueous medium to appreciably reduce the energy necessary to produce smaller particle sizes. The attrition produces a mass containing some particles having a size of less than 1 micron, however, upon drying, the minute particles agglomerate to form larger sized particles. Drying many be effected by any means such as, for example, air drying, vacuum drying and spray drying. Preferably, the material for use in this invention is spray dried and in the drying the particles become somewhat hornified probably due to the temperatures normally used in the spray drying process. For the purposes of this invention, the water-insoluble, organic material containing the β-1,4 glucan should consist of particles at least about 85% by weight of which pass a 325 mesh screen and not more than about 3% by weight of which is retained on a 200 mesh screen as determined by a wet screening.

For the purpose of the invention, water-insoluble derivatives of β-1,4 glucan having the same physical characteristics and properties may be substituted for β-1,4 glucan. These derivatives include, for example, oxidation derivatives containing one or more chemical groups including aldehyde, carboxyl and mixed aldehyde-carbonyl derivatives, ether derivatives characterized by having one or more —OR groups where R may be an aliphatic or substituted aliphatic radical, either a straight or branched chain containing from one to twelve or more carbon atoms, an aryl or aralkyl or substituted aralkyl radical or a carboxyalkyl, hydroxyalkyl, cyanoalkyl, alkoxyalkyl, aralkyloxyalkyl, or a dialkylaminoalkyl radical; and ester derivatives, for example, esters of inorganic acids such as nitrates, sulfates, phosphates, and esters of organic acids such as formates, acetates, propionates, butyrates, thiocyanates, mixed acetate-propionates, mixed acetatebutyrates, other aliphatic carboxylic acid derivatives containing up to 18 or more carbon atoms, and aryl or aralkyl esters such as, for example, benzoates, phenylacetates, phthalates, naphthonates, and the like.

These derivatives may be prepared before the chemical and mechanical attrition treatment by derivatizing the β-1,4 glucan-containing material to obtain a water-insoluble product, or the finely-divided β-1,4 glucan material may be derivatized to obtain essentially water-insoluble topochemical derivatives. In any event, the finely-divided β-1,4 glucan or its derivatives must be water-insoluble and have the physical characteristics and properties as described hereinbefore.

The proportion of the finely divided cellulose incorporated in the cellulosic film may vary from about 1% up to about 30% by weight and the specific amount will be dependent upon the finish desired on the molded article. Preferably, the finely divided material is dispersed in water and the water dispersion then added to and thoroughly mixed with the viscose. The viscose is extruded into the usual spinning bath and the film then subjected to the conventional wet aftertreatment and dried.

The Werner type complex compound is dissolved in water or a non-aqueous solvent or a water-organic-solvent mixture and applied to the film by any conventional method normally used in the manufacture of coated cellophane. These methods may involve dipping, spraying, or roll coating and the amount of coating is metered by any known means to provide a finished coating of from about 0.08 pound to about 2.0 pounds of the complex compound per 10,000 square feet of surface area.

Preferably, the chromium complex compound is dissolved in a mixture of water and organic solvents so as to permit the use of conventional coating apparatus which utilizes a solvent recovery system. The use of the water-organic solvent mixture also aids in preventing the penetration of the coating into the interior of the film. The aluminum complex compound may be dissolved in organic solvents.

The chromium complex compounds of the Werner type for use in the present invention are marketed under the tradename "Quilon" and are described and claimed in U.S. Pat. 2,273,040, granted Feb. 17, 1942, and the corresponding aluminum compounds are marketed under the tradename "Aluminum Complex 101." As disclosed in this patent, the materials may be described as Werner complex compounds characterized by having therein associated with a trivalent nuclear chromium or aluminum atom and an acyclic carboxylic acido group having at least 10 carbon atoms. Such acido groups are described as functional acido groups and may be present as simple coordinated groups held by either principal or auxiliary valences, or they may be present as bridging groups between two nuclear chromium or aluminum atoms. The chemistry and properties of commercially available compounds of this type are described in Du Pont Product Information Bulletins entitled "Quilon Chrom Complex" (A-18204), "Quilon C Chrom Complex" (A-29486) and "Aluminum Complex 101" (A-24180). The disclosure of these publications are to be considered as incorporated herein.

The resin is molded or cast on the coated surface of the film in the normal manner by interposing the film between the surface of the resin and the press plate. The specific molding or casting conditions and procedure will be dependent upon the article being produced and upon the specific resin. The departure from conventional practice resides in the molding and setting of the resin surface in contact with the coated non-fibrous cellulosic film or sheet containing the finely divided water-insoluble organic particles. Upon completion of the molding operation, the film adheres to the resin surface and may be allowed to remain on the surface during subsequent handling. For example, in the case of a tabletop, the sheet may be allowed to remain on the surface during subsequent handling and assembling to the table frame and may be allowed to remain on the surface during shipping and eventually be easily stripped after delivery to the purchaser.

The method of this invention is particularly adapted for use in high pressure molding procedures and particularly where the resin is subjected to pressure and heat to cure the resin prior to removing the molded article from the molding press. It is recognized that there is no well defined boundary between high pressure and low pressure molding methods based merely upon the pressures utilized in the molding operation. In the case of allylic resins, the pressures may be as low as 200 to 300 p.s.i. One limitation in the use of the present method is that the temperatures involved in the curing of the resin must remain below the decomposition temperature of the cellulosic film. Although the method may be used in casting or molding of thermoplastic resins, its particular advantages are realized in the molding of thermosetting resins. For example, molding of melamine-formaldehyde type resins by the use of the films containing the β-1,4-glucan-containing material without the coating of the Werner type complex results in the film adhering to the molded surface so tenaciously that it cannot be separated from the molded surfaces. On the other hand, when the film is provided with the coating, the film will adhere to the molded surface sufficiently to permit considerable handling but the film may be separated from the panel by peeling when it is desired to remove the film.

Thermosetting resins include, for example, unsaturated polyester type resins which result from the reaction of a polyhydroxy compound and a polybasic acid and have reactive groups remaining in the molecule which will react when heated or in the presence of a catalyst or curing agent to form an infusible product, e.g., reaction product of glycerol and phthalic anhydride, reaction products of unsaturated dibasic acids including maleic, fumaric, itaconic, citraconic, or messaconic with a dihydric alcohol including the polymethylene glycol series from ethylene glycol to decamethylene glycol and the polyethylene glycol series from diethylene glycol to nonaethylene glycol, dipropylene glycol, glycerol monoesters, glycerol and pentaerythritol, urea-formaldehyde, melamine-formaldehyde, phenolic resin, allylic type resins, etc. Modifiers may be added to the above thermosetting resins which copolymerize therewith when the resin is cured. Such modifying materials include polymerizable hydrocarbons containing a $CH_2=C<$ linkage such as styrene, cyclopentadiene and divinyl benzene.

These resins may be mixed with fillers including wood flour, cotton floc, glass fibers, metallic filaments and particles, silicate fibers and particles, synthetic resin fibers and particles, rubber particles, asbestos fibers, mica particles, cellulose fibers, crystalline cellulose and the like. The resin may be used to impregnate fibrous sheets either woven or non-woven. Dyes, pigments and coloring agents are also used therein.

The foregoing enumeration is intended merely to illustrate some of the thermoplastic and thermosetting resins, fillers, etc., which are satisfactory for the purposes of the invention.

The following example is set forth to illustrate the method of this invention.

EXAMPLE I

Regenerated cellulose base films containing approximately 2.5% and 9.7% based on the weight of the film of the finely-divided cellulose particles were selected along with a cellophane film to which no additives were added. In preparing the films containing the finely-divided cellulose particles, an aqueous dispersion of the cellulose particles was injected into the viscose just prior to extrusion. The finely-divided cellulose particles were prepared by acid hydrolysis of a highly refined wood pulp, attriting the washed residue and spraying a water slurry of the attrited material at about a 15% solids concentration into an air stream having a temperature of between 500° and 600° F. The finely-divided material was of such particle sizes that at least 85% passed a 325 mesh screen and not more than 3% was retained on a 200 mesh screen. The viscose films were otherwise spun in a conventional manner.

The coating solution was prepared by adding 3 parts by weight of an isopropanol solution of a stearic acid-chromium complex of the type described to 7 parts by weight of water preheated to 93.5° C. The isopropanol solution used was a commercially available solution containing about 30% by weight of the Werner type complex and marketed under the trademark "Quilon" C. The solution was then added to 85 parts by weight of a solvent mixture composed of 70% ethyl acetate and 30% ethyl alcohol by volume. A solution of 1 part urea in 4 parts of water was then added to the solution. The final coating solution was sprayed onto the surface of the cellulosic films and the quantity was metered by passing the coated film between spaced rollers in a conventional cellophane coating machine at 100 ft./min. The films were then passed through a conventional dryer having three inline heating zones, the first maintained at 230° F. and the second and third zones maintained at 170° F. In these heating zones, the air and vapors are constantly removed and passed through a zone to recover the organic solvents. The films had a coating of about 1 pound of the Werner type complex per 10,000 square feet of surface area.

Samples of the three uncoated films and samples of the coated films were used in preparing laminated panels. In each instance, seven sheets of a conventional phenolic impregnated kraft paper were stacked on a steel caul plate. A sheet of conventional pattern paper impregnated with a melamine resin was placed over the kraft paper stack. A sheet of conventional overlay paper impregnated with a melamine resin was placed over the pattern paper. A sheet of the cellophane was placed over the overlay paper and a steel caul plate brought into contact with the cellophane sheet. In those samples having the coated surface, the coated surface was placed in contact with the overlay paper. The press platens were then heated to 315° C. and the pressure applied was 1,300±100 p.s.i. The pressure and heat were maintained for about 15 minutes after which the heat was discontinued and the laminates allowed to cool to about 120° F. while maintaining the pressure. After the temperature was reduced to this value, pressure was released and the laminated panels removed from the press.

In the case of the laminated panels formed with the uncoated cellophane facing sheets, the cellophane could not be separated from the panels. In the case of the panels prepared with facing sheets coated as described, the sheets adhere sufficiently to the panels to permit handling without separation of the sheets but when desired the facing sheets could be readily peeled from the panels.

Gloss measurements were made of the panels from which the cellophane sheets were peeled using a conventional 60° Gardner Glossmeter which was calibrated within ±2 units using a highly polished standard (94 reading) and a lower gloss standard (42 reading). At least three readings were made in each direction for each test panel. The following table shows the average gloss measurements for test panels prepared with the above-described release films containing various amounts of finely-divided cellulose particles.

TABLE I

| Cellulose particle content, based on film weight, percent | Gloss reading |
|---|---|
| None | 50.0 |
| 2.5 | 21.9 |
| 9.7 | 9.9 |

EXAMPLE II

Example I was repeated with the exception that a myristic acid-aluminum complex of the type described was used as a coating for the coated regenerated cellulose films. The coating solution was a solution of the aluminum complex in a mixture of isopropanol, ethyl acetate and ethyl alcohol. The isopropanol solution used was a commercially available solution containing about 18% by weight of the aluminum complex and marketed under the tradename "Aluminum Complex 101." The coating solution was prepared by diluting 1 pound of the isopropanol-aluminum complex solution as obtained with 99 pounds of a mixture composed of 70% ethyl acetate and 30% ethyl alcohol by volume. The coating was applied and dried as described in Example I.

xamples of the coated films were used in preparing laminated panels as described in Example I.

Examples of the coated films were used in preparing laminated panels as described in Example I.

The coated sheets adhered to the molded surface of the panels with a sufficient degree of adhesion to permit handling of the panels without dislodging or separating the sheets from the surface of the panels, but the sheets could be readily peeled from the panels when desired. Gloss measurements of the molded surfaces after removal of the sheets using the same 60° Gardner Glossmeter showed average gloss measurements for the test panels substantially those set forth in Table I.

EXAMPLE III

Laminated panels were prepared in a similar manner wherein the kraft paper plies, pattern paper and overlay paper were impregnated with a conventional allylic resin, namely, the resin marketed commercially as "Dapon." In preparing these panels after closing the press, the temperature was raised to 315° F. and in the instance of this type of resin, it was only necessary to use a pressure of 300 p.s.i. Pressure and heat were applied for 15 minutes and the heat then discontinued while maintaining the pressure until the panels had cooled to about 120° F.

In those instances where uncoated cellophane sheets were used over the overlay paper, the cellophane sheets could not be stripped from the laminated panels. In those instances where the coated sheets were placed in contact with the overlay paper, the coated sheets adhered sufficiently to the surface of the laminated panel to permit handling and could be readily stripped or peeled from the panels when desired.

Although the invention has been illustrated by reference to regenerated cellulose films as the base film, other cellulosic film-forming materials such as, for example, cellulose ethers and esters, are equally satisfactory. For example, alkali solutions of hydroxyethyl cellulose may be substituted for the viscose solution.

The advantages of the molding method of the present invention are quite apparent. Molded articles having any predetermined gloss may be obtained employing a single highly polished press or caul plate merely by interposing a coated cellulosic sheet containing the finely-divided cellulosic material. The inexpensive films having different proportions of finely-divided cellulosic material may replace a plurality of expensive molds or press plates having a specific surface finish. The gloss produced by the films may be predetermined by selection of finely-divided cellulosic material of different particle sizes and by the proportion of finely-divided cellulosic material incorporated in the film.

Flat sheet laminates may be made in a continuous method. The desired fibrous sheets are drawn from rolls and impregnated with the desired resin as by passing the sheets through suitable resin baths. The impregnated sheets are then brought together, and a continuous coated cellulosic film containing the finely-divided cellulosic material brought into contact with one surface of the laminated sheet and an inexpenive sheet, such as the coated cellophane, is brought into contact with the opposite surface. The assembly is then passed between suitable rolls so as to bring the sheets into a desired compact relationship after which the assembly is passed through required pressing and heating zones to mold and cure the resin. Panels of desired size are cut from the laminate and stored. The surface film may be allowed to remain adhered to the surface during subsequent handling and peeled away when desired.

We claim:
1. In a method of forming a laminated panel comprising a thermosetting synthetic resin wherein the resin is set in contact with a releasable film, the improvement which comprises molding under heat and pressure sheets comprising a thermosetting resin in contact with a non-fibrous cellulosic sheet containing finely-divided, water-insoluble organic particles, a major proportion consisting of $\beta$-1,4 glucan, at least about 85% by weight of which have a size no greater than about 44 microns and not more than about 3% by weight of which have a size greater than 74 microns, and having a surface coating of a complex compound of the Werner type in which a trivalent nuclear metal atom selected from the group consisting of aluminum and chromium is coordinated with an acyclic carboxylic acido group having at least 10 carbon atoms.

2. In a method as defined in claim 1 wherein the cellulose sheet is a regenerated cellulose sheet containing from about 2.5% to about 20% by weight of the finely-divided particles.

3. In a method as defined in claim 2 wherein the coating is a complex compound of the Werner type in which the trivalent nuclear metal is aluminum.

4. In a method as defined in claim 2 wherein the coating is a complex compound of the Werner type in which the trivalent nuclear metal is chromium.

References Cited

UNITED STATES PATENTS

| | | |
|---|---|---|
| 2,273,040 | 2/1942 | Iler. |
| 3,215,579 | 11/1965 | Hagen. |
| 3,224,898 | 12/1965 | Spencer _____ 117—76 |
| 3,259,537 | 7/1966 | Battista _____ 260—212 |
| 3,275,580 | 9/1966 | Battista _____ 117—145 |
| 3,373,237 | 3/1968 | Mihalik et al. _____ 264—316 |

OTHER REFERENCES

Handbook of Material Trade Names by Zimmerman and Lavine. Supplement I to the 1953 edition, page 196.

REUBEN EPSTEIN, Primary Examiner

U.S. Cl. X.R.

264—316; 156—323; 117—144.5

UNITED STATES PATENT OFFICE
CERTIFICATE OF CORRECTION

Patent No. 3,533,875　　　　　　　　Dated October 13, 1970

Inventor(s) Frank E. Carevic and Joseph L. Sannella

It is certified that error appears in the above-identified patent and that said Letters Patent are hereby corrected as shown below:

Col. 1, line 16, in the "ABSTRACT OF THE DISCLOSURE" "these" should be --the--
Col. 2, line 17, after "flax" insert a comma -- , --
Col. 3, line 4, "carbonyl" should read -- carboxyl --
Col. 6, omit lines 31 and 32 as they are repeated in lines 33 and 34.

SIGNED AND
SEALED
DEC 29 1970

(SEAL)
Attest:

Edward M. Fletcher, Jr.
Attesting Officer

WILLIAM E. SCHUYLER, JR.
Commissioner of Patents